E. & B. MILLER.
Plow-Fender.
No. 25,432
Patented Sept. 13, 1859
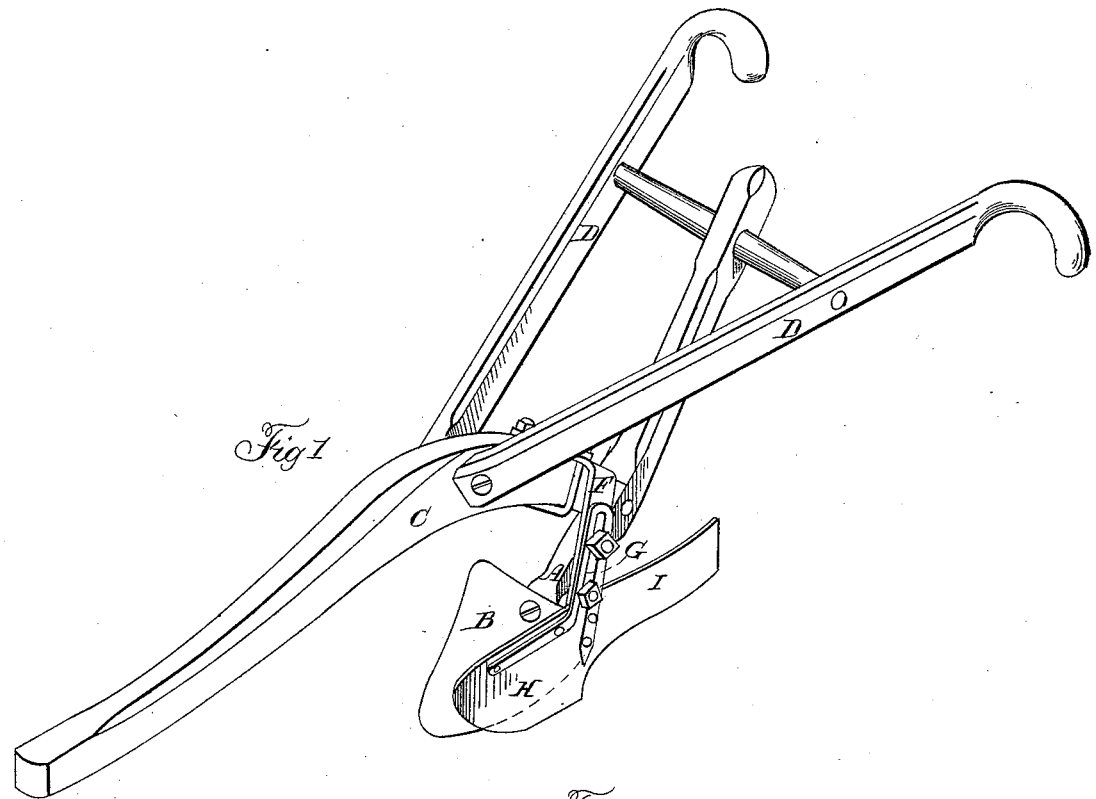
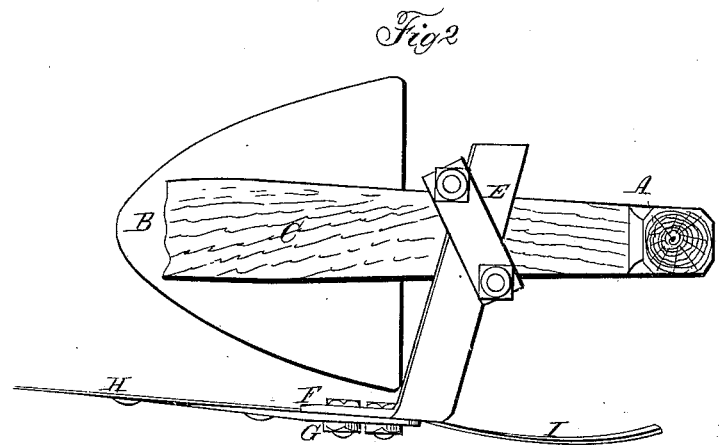
Witnesses;
Geo. H. Knight
William H. Johnston
Inventor;
Edmund Miller
Benjamin Miller

UNITED STATES PATENT OFFICE.

EDMUND MILLER AND BENJAMIN MILLER, OF RISING SUN, INDIANA.

IMPROVEMENT IN CULTIVATORS.

Specification forming part of Letters Patent No. 25,432, dated September 13, 1859.

*To all whom it may concern:*

Be it known that we, EDMUND MILLER and BENJAMIN MILLER, both of Rising Sun, Ohio county, Indiana, have invented a certain new and useful Improvement in Shovel-Plows or Cultivators; and we hereby declare the following to be a full, clear, and exact description of the same, reference being had to the accompanying drawings, making part of this specification.

The subject of our said improvement is a device by means of which the more friable earth is forwarded to the plants, while clods and larger masses are thrown into the furrow behind the share.

In the accompanying drawings, Figure 1 is a perspective view. Fig. 2 is a top view of a portion of the plow.

A B C D represent respectively the sheth, share, beam, and handles of a shovel-plow of any approved construction. Affixed adjustably to the top of the beam C is an inverted-L bracket, E F. To the depending limb F of this bracket is attached adjustably the slotted shank G of a peculiarly-formed blade, H I, called the "guard," occupying a position parallel, or nearly so, with the line of motion. The front portion, H, of the guard is formed in front and on its under side with a convex cutting-edge, as represented, and is adapted to penetrate to a small distance into the ground. The rear portion, I, is curved horizontally, its concave side being toward the plow, and is a sufficient distance above the ground to allow the friable earth to pass beneath it toward the plants.

It will be seen that the guard H I can be set in or out from the beam, and so as to enter the ground to a greater or less depth. In practice, however, we have found it convenient to set it at such distance to one side of the shovel as just to avoid grazing the plants, and at such depth that the forward portion, H, enters the ground about two inches. The portion H serves to prevent the unearthing or upheaval of the plants by the shovel, and to sever any clods which intercept its path. The entire guard serves to prevent clods falling on the plants, the friable earth thrown up by the shovel passing under the wing to the plants.

The curved form of the wing enables the passage backward of all clods which enter the throat, and acts to throw such clods back into the furrow. Clods too large to pass the throat are thrown off on the other side.

This implement can be worked much nearer the hills than an unguarded shovel, and save the necessity of the usual going over to restore crushed and displaced plants—a service often in this busy season neglected until too late. With one of these plows a lad can set up well and thoroughly several acres per day. The guard can be easily shifted to work on either side.

For some crops—such as potatoes, beans, tomatoes, &c.—the implement may have a guard on each side. When the clods are very large the guard should be set deeper, and vice versa.

After the corn is a few weeks old the guard may be removed and the plow worked in the ordinary manner.

This improvement is believed to save the value of a farm-hand, or several times its own cost, in one season.

We are aware that guards have been applied to shovel-plows to prevent the larger masses of earth from being thrown upon the plants, and also that guards have been curved horizontally behind the share, as in the cotton-hiller of A. W. Washburn, patented March 25, 1856; but we know of no instance in which a guard has been constructed in the manner we have described, so as to combine the following functions: First, protecting young plants from upheaval by the passage of the plow; second, deflecting the friable mold at once backward and outward through a contracted channel beneath the elevated wing of the guard; third, permitting the larger masses of earth to pass freely backward, and afterward deflecting them into the furrow behind the share by means of the double horizontal curve of the elevated wing I. We do not therefore lay claim to any of the parts of our above-described invention, separately considered, their combination, as herein set forth, being essential to the accomplishment of the object sought.

We claim as new and of our invention, and desire to secure by Letters Patent—

The combined arrangement of the guard H, elevated wing I, curved horizontally in two directions, adjusting-shank G, and bracket E F, operating in connection with a shovel-plow, in the manner and for the purpose set forth.

In testimony of which invention we hereunto set our hands.

EDMUND MILLER.
BENJAMIN MILLER.

Witnesses:
GEO. H. KNIGHT,
WILLIAM H. JOHNSTON.